(12) United States Patent
Son et al.

(10) Patent No.: US 7,727,315 B2
(45) Date of Patent: Jun. 1, 2010

(54) CONDENSED WATER DISCHARGED APPARATUS FOR FUEL CELL SYSTEM

(75) Inventors: Youngjin Son, Seongnam-si (KR); Youngbum Kum, Seoul (KR); Sungho Lee, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 423 days.

(21) Appl. No.: 11/949,565

(22) Filed: Dec. 3, 2007

(65) Prior Publication Data

US 2009/0025566 A1 Jan. 29, 2009

(30) Foreign Application Priority Data

Jul. 26, 2007 (KR) .................. 10-2007-0074875

(51) Int. Cl.
*B01D 19/00* (2006.01)

(52) U.S. Cl. .................. 96/155; 96/157; 96/397

(58) Field of Classification Search .............. 96/155, 96/157, 187, 204, 206, 397; 429/12
See application file for complete search history.

(56) References Cited

U.S. PATENT DOCUMENTS 6,579,637 B1 * 6/2003 Savage et al. .................. 429/12
7,150,927 B2 * 12/2006 Hickey et al. .................. 429/12

FOREIGN PATENT DOCUMENTS

| JP | 2002-008693 | | 1/2002 |
|---|---|---|---|
| JP | 2004-039462 | | 2/2004 |
| JP | 2005-243357 | A | 9/2005 |
| JP | 2006-221949 | A | 8/2006 |
| JP | 2006-266164 | | 10/2006 |
| KR | 10-0639013 | | 10/2006 |

\* cited by examiner

*Primary Examiner*—Robert A Hopkins
(74) *Attorney, Agent, or Firm*—Morgan, Lewis & Bockius LLP

(57) ABSTRACT

A condensed water discharging apparatus for a fuel cell system is disclosed. The condensed water discharging apparatus includes: a drain tank installed around a hydrogen discharging line comprising an inlet portion, an outlet portion formed on both distal ends of the drain tank, and a intermediate portion having at least a drain hole installed wherein the intermediate portion is disposed inside the drain tank so that condensed water is separated from hydrogen flowing in through the intermediate portion by gravity and is drained downwardly; and a drain pump connected to the drain tank to discharge condensed water drained through the drain holes of the intermediate portion.

9 Claims, 3 Drawing Sheets

US 7,727,315 B2

CONDENSED WATER DISCHARGED APPARATUS FOR FUEL CELL SYSTEM

CROSS-REFERENCE TO RELATED APPLICATION

This application claims the benefit under 35 U.S.C. § 119(a) on Korean Patent Application No. 10-2007-0074875 filed on Jul. 26, 2007, the entire contents of which are incorporated herein by reference.

BACKGROUND OF THE INVENTION

1. Field of the Invention

The present invention relates to a condensed water discharging apparatus for a fuel cell system, and more particularly, to condensed water discharging apparatus for a fuel cell system which serves to separate the water generated at an anode and drain it so as to prevent the condensed water from being recirculated with unused hydrogen during hydrogen recirculating process.

2. Description of the Related Art

In general, a fuel cell system generates electricity using hydrogen and oxygen in the air, and this fuel cell system may be used as a power source of a vehicle.

A fuel cell system comprises a separator, an anode, an electrolyte membrane, a cathode, a hydrogen/air/cooling water distributing structure, an anode flow field, a cathode flow field, and a cooling flow field.

When a fuel cell system is driven, hydrogen is supplied from a hydrogen tank to an anode flow field of a fuel cell system through a hydrogen supplying solenoid valve and a pipe.

In order to increase efficiency of hydrogen as a fuel, non-reacted hydrogen is recirculated. This procedure is performed such that a hydrogen recirculation blower is operated in a state that a purge valve is closed, non-reacted hydrogen in a fuel cell system moves along a pipe and goes into an anode flow field of a fuel cell system through a hydrogen recirculation blower and a hydrogen recirculation blocking valve.

A hydrogen purge value is configured to be opened at a periodically predetermined time to discharge nitrogen and water which come through an electrolyte membrane.

Air is supplied from the atmosphere to an air blower through a pipe, and an air blower controls an air flow rate according to a driving condition so that air is supplied to a cathode flow field of a fuel cell system through a pipe.

Hydrogen ($H_2$) at an anode flow field dissociates into positive hydrogen ions and negatively charged electrons, in which the hydrogen ions are conducted through an electrolyte membrane to the cathode. $O_2$ at a cathode flow field dissociates to O— ions by catalyst, and the positive hydrogen ions and O— ions react to form $H_2O$.

Meanwhile, in a conventional fuel cell system vehicle, condensation of vapor occurs in a cathode as well as in an anode according to a driving condition, and condensed water needs to be removed to improve durability, lifespan and performance of a fuel cell system.

Water generated in an anode is discharged from a fuel cell system stack system to be transferred to a hydrogen recirculation blower and is then mixed with pure hydrogen which comes out of a hydrogen tank before going into an anode flow field of a fuel cell system stack again.

By the above described method, waste of hydrogen can be avoided, resolving a security problem occurred when hydrogen is discharged to the air.

However, hydrogen discharged from a fuel cell system stack contains water inevitably generated in a fuel cell system. A vapor form does not cause any problem, but condensed water inevitably generated according to a driving condition causes many problems.

If condensed water generated in a hydrogen side (i.e., anode) goes to a recirculation blower, a recirculation blower causes overload, so that flooding occur at an entrance of a fuel cell system stack system, thereby fatally degrades durability of a fuel cell system stack and a recirculation blower.

Also, if hydrogen is discharged to the air together with condensate water, there occurs a dangerous safety problem in a vehicle, and thus hydrogen should not be discharged into the ambient air.

In order to resolve the above problem, a conventional fuel cell system vehicle employs a water discharging apparatus for removing condensed water using gravity.

FIG. 1 is a perspective view illustrating a conventional water discharging apparatus. The conventional water discharging apparatus is arranged in an engine room together with a fuel cell system. The conventional water discharging apparatus of FIG. 1 comprises a housing 3, a solenoid valve 4 installed in the outlet portion 2 to adjust a flow rate, and water level sensors 5 and 6 for sensing a water level of condensed water in the housing 3. The housing 3 has an inlet portion 1, arranged in its upper portion, through which condensed water flows in and an outlet portion 2, arranged in its lower portion, through which condensed water is discharged.

The housing has the total length of 185 mm and the total volume of 680 ml, and as the water level sensors, a high water level sensor 5 installed in an upper portion of the housing 3 and a low water level sensor 6 installed in a lower portion of the housing 3 are provided.

When condensed water flowing in through the inlet portion 1 of the housing 3 reaches a level of the high water level sensor 5, the solenoid valve 4 is opened to discharge condensate water, and when condensed water is lowered to a level of the low water level sensor 6, the solenoid valve 4 is closed not to discharge condensed water any more, whereby it is possible to remove condensed water contained in recirculated hydrogen and to prevent hydrogen from being discharged to the air.

If a fuel cell system is employed in a vehicle such as a sedan later, a fuel cell system should be arranged on a floor of a vehicle. However, in this instance, it is difficult to apply the existing water discharging apparatus which removes condensed water by using gravity "as is".

The reason why the existing water discharging apparatus can not be applied in case where a fuel cell system is arranged on a floor of a vehicle is described below in detail.

FIG. 2 is a schematic view illustrating a ground clearance when a fuel cell system stack 8 is mounted on a central floor 7 of a sedan type vehicle. In case of a sedan type vehicle, a ground clearance of FIG. 2 could be improved later, but the improvement range is limited. A reference numeral 9 denotes a hydrogen tank.

In this instance, a ground clearance is merely 170 mm, i.e., the distance from the lowest surface of the fuel cell system stack 8, and so it is difficult to use the existing water discharging apparatus having the total length of 185 mm. Since the existing water discharging apparatus uses gravity to discharge water, water can be discharged from the fuel cell system stack by gravity only when it is arranged below the lowest surface of the fuel cell system stack 8. In order to remove condensed water by using gravity in a sedan type vehicle of FIG. 2, a ground clearance should be lowered to less than 150 mm, but the existing water discharging apparatus can secure merely the height of about 20 mm.

Even though the existing water discharging apparatus is modified, it is almost impossible to secure an enough ground clearance because of the length of 185 mm.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

The present invention has been made in an effort to solve the aforementioned problems associated with prior arts.

In one aspect, the present invention provides a condensed water discharging apparatus for a fuel cell system in which a drain tank of a cylinder form which collects condensed water is substantially horizontally installed in the middle of a hydrogen discharging line, and condensed water of a desired amount is externally discharged at a desired time by using a microelectromechanical system (MEMS) type pump, whereby it is possible to prevent condensed water from going to a recirculation blower and a fuel cell system stack during hydrogen recirculation and a sufficient ground clearance is secured. Accordingly, the condensed water discharging apparatus according to the present invention can be employed in a sedan type fuel cell system vehicle.

In a preferred embodiment, the present invention provides a condensed water discharging apparatus for a fuel cell system, comprising: a drain tank installed around a hydrogen discharging line comprising an inlet portion, an outlet portion formed on both distal ends of the drain tank and a intermediate portion having at least a drain hole and installed inside the drain tank so that condensed water is separated from hydrogen flowing in through the intermediate portion by gravity and is drained downwardly; and a drain pump connected to the drain tank to discharge condensed water drained through the drain holes of the intermediate portion.

The drain tank has a cylindrical form that its longitudinal length is longer than its diameter and is installed in a horizontal direction along the hydrogen discharging line.

With respect to the intermediate portion of hydrogen discharging line, the inlet portion is downwardly inclined, and the outlet portion is upwardly inclined. The drain pump comprises a load cell mounted on an entrance thereof and detecting whether a fluid drained from the drain tank is hydrogen or condensate water, and the drain pump receives a detecting signal from the load cell and maintains a closed state if the fluid is regarded as hydrogen and is opened if the fluid is regarded as condensate water.

The intermediate portion of hydrogen discharging line is formed in a tube in which the inlet portion and the outlet portion are integrally formed at both distal ends of the intermediate portion for fluid communication.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE INVENTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 1:
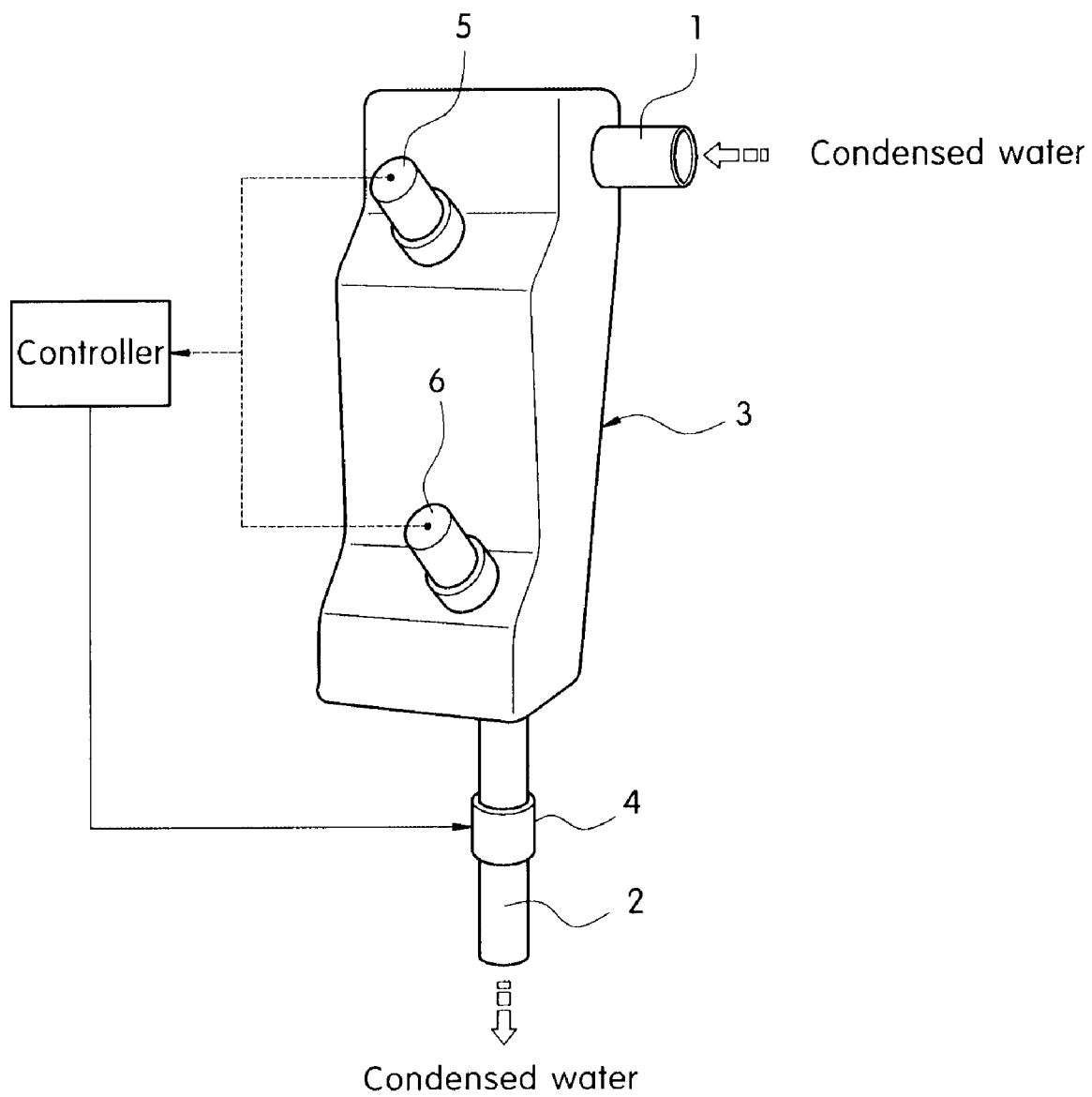
FIG. 1 is a perspective view illustrating a conventional water discharging apparatus.
Figure 2:
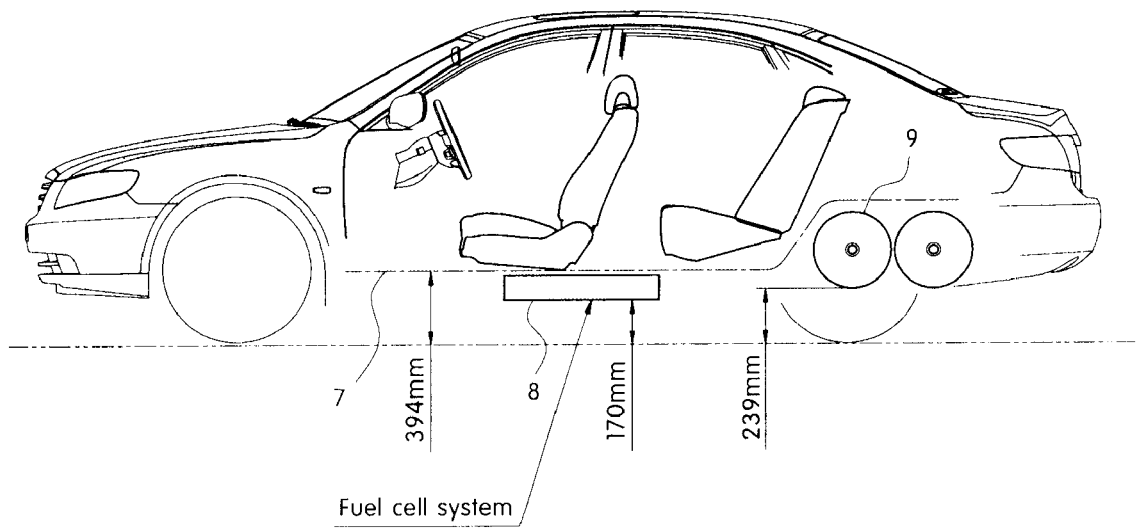
FIG. 2 is a schematic view illustrating a ground clearance when a fuel cell system stack is mounted on a central floor of a sedan type vehicle.
Figure 3:
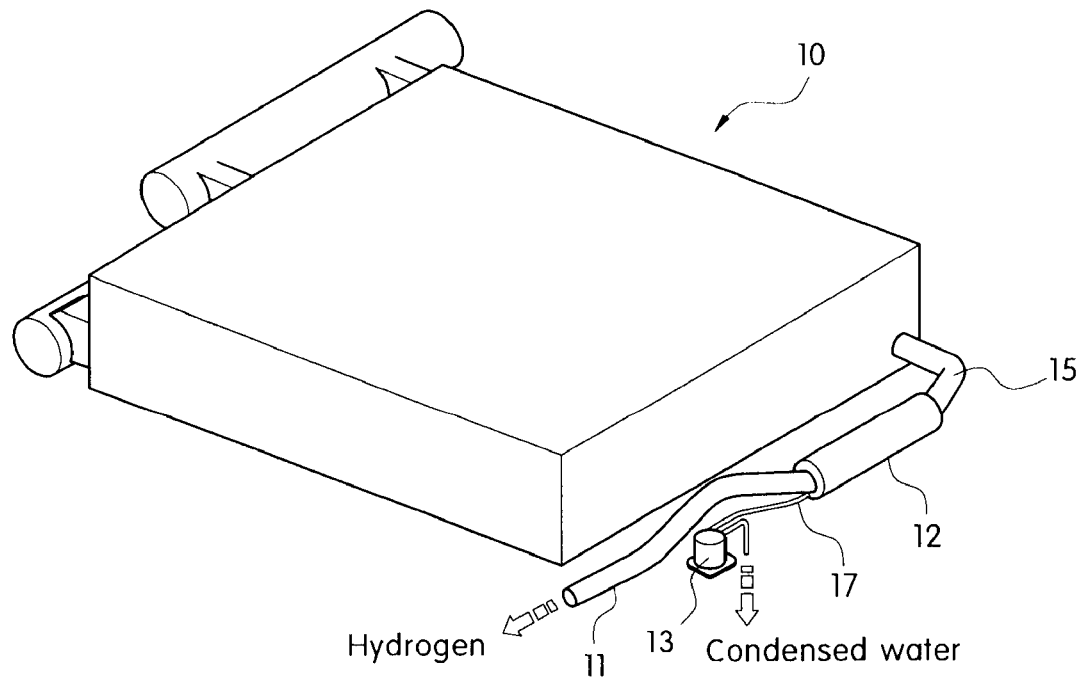
FIG. 3 is a perspective view illustrating a condensed water discharging apparatus for a fuel cell system according to an exemplary embodiment of the present invention.
Figure 4:
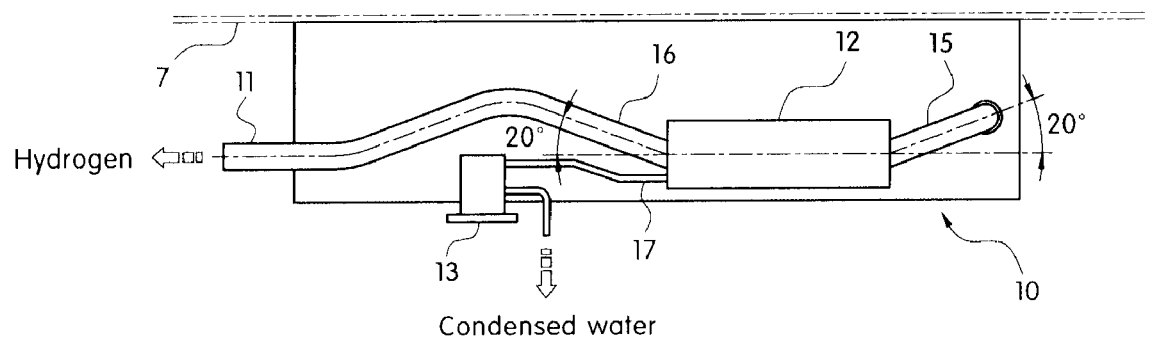
FIG. 4 is a side view illustrating the condensed water discharging apparatus of FIG. 3.
Figure 5:
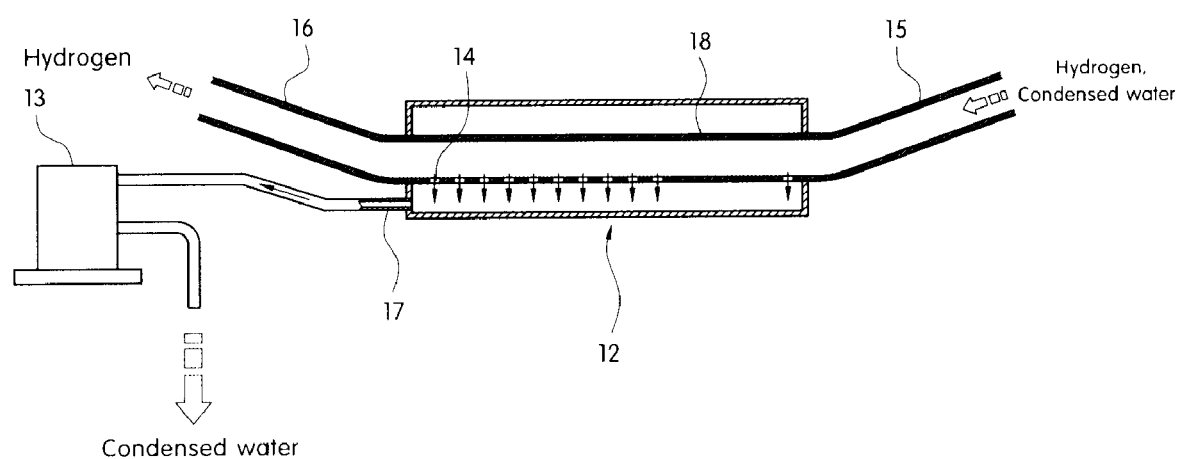
FIG. 5 is a cross-sectional view illustrating an internal structure of a drain tank of the condensed water discharging apparatus of FIG. 3.

FIG. 3 is a perspective view illustrating a condensed water discharging apparatus for a fuel cell system according to an exemplary embodiment of the present invention. FIG. 4 is a side view illustrating the condensed water discharging apparatus of FIG. 3. FIG. 5 is a cross-sectional view illustrating an internal structure of a drain tank of the condensed water discharging apparatus of FIG. 3.

According to the present invention, condensed water generated in an anode is removed to be not mixed with hydrogen during hydrogen recirculation, and hydrogen is not discharged into the air.

The condensed water discharging apparatus for separating condensed water generated in the anode by using gravity and discharging it has a structure which can be applied to a sedan type fuel cell system vehicle.

According to an exemplary embodiment of the present invention, the condensed water discharging apparatus is installed in the middle of a hydrogen discharging line 11

The condensed water discharging apparatus comprises a drain tank 12, hydrogen discharging line 11 having an inlet portion 15 and an outlet portion 16 formed on both distal ends of drain tank 12. The condensed water discharging apparatus further comprises intermediate portion wherein at least a drain hole is installed along the intermediate portion of the hydrogen discharging line so that condensed water is separated from hydrogen flowing in through the intermediate portion by gravity and is drained downwardly through the drain hole onto the drain tank 12 as shown in FIG. 5. A drain pump 13 drains a desired amount of condensed water collected in the drain tank 12 at a desired time.

In detail, a body of the drain tank 12 has a cylinder form and has a structure that the longitudinal length is longer than the diameter and condensed water contained in hydrogen moving along the intermediate portion 18 falls through drain holes 14 of the intermediate portion 18 onto the bottom of drain tank 12.

Condensed water having the large weight contained in hydrogen falls into the drain holes 14 by gravity. In this instance, since the strength or magnitude of gravity depends on potential energy, the inlet portion 15 and the outlet portion 16 are inclined at a predetermined angle with respect to the intermediate portion 18 so that condensed water can be affected by gravity as much as possible.

With respect to the intermediate portion of hydrogen discharging line, the inlet portion 15 is inclined downwardly, and the outlet portion 16 is upwardly inclined.

As a preferred embodiment, the angle between the inlet portion 15 with respect to the longitudinal direction of the intermediate portion is substantially 20 degrees and the angle between the outlet portion 15 with respect to the longitudinal direction of the intermediate portion is substantially 20 as shown in FIG. 4.

A drain port 17 for discharging condensed water dropped through the drain holes 14 is formed in a lower portion of the drain tank 12.

The condensed water discharging apparatus having the above described structure can be applied to a sedan type fuel cell system vehicle since an sufficient ground clearance is secured and thus efficiency for discharging condensed water using gravity is improved even if a fuel cell system stack 10 is mounted on a bottom of a floor of a vehicle.

The drain pump 13 serves to discharge condensed water stored in the drain tank 12 through the drain holes 14, and a connecting hose or a connecting pipe for discharging condensed water is installed between the drain pump 13 and the drain tank 12.

As the drain pump 13, a pump developed for a microelectromechanical system (MEMS) is preferably used. Preferably, the drain pump 13 should satisfy the following three requirements.

Firstly, the maximum amount of water can be discharged under the maximum power condition of the system when the discharge amount of water is more than 100 mL per minute.

Secondly, the drain pump has both a sensor function and a valve function in order to replace the two water level sensors and the solenoid valve of the existing system with a single pump.

Here, the drain pump is supposed to be normally closed status (NC status), and should be furnished with a load sensor function at an entrance of the pump. Namely, by employing the load sensor, which detects the difference of load applied to the pump depending on the fluid (liquid or gas), the pump is capable of activating itself only when liquid flow is entered therein. Preferably, in order to prevent corrosion caused by hydrogen, the pump uses a polytetrafluoroethylene (PTFE) diaphragm.

An operation of the condensed water discharging apparatus according to the exemplary embodiment of the present invention is described below.

Condensed water may flow into an anode of the fuel cell system stack 10 to which hydrogen is supplied through an electrolyte membrane or together with recirculated hydrogen, and such condensed water increases a load of the recirculation blower or is stuck to an electrode of the stack, deteriorating the performance of the fuel cell system stack. For this reason, in order to separate condensed water from hydrogen and discharge it, condensed water is forced to flow into the drain tank 12 installed in the middle of the hydrogen discharging line 11.

When hydrogen which flows into the drain tank 12 through the inlet portion 15 goes through the intermediate portion 18 disposed in the drain tank 12, condensed water in hydrogen, having the large weight, drops into the drain holes 14 of the intermediate portion 18 to be transferred to the drain pump 13 through the drain port 17.

If a fluid moving to an entrance of the drain pump 13 is detected as hydrogen gas other than condensate water, a load cell signals it to a controller (not shown) to maintain a closed state of the drain pump, and if it is detected as condensate water, the drain pump 13 is opened to discharge condensate water. At this time, the open and close of the drain pump 13 may be controlled by a detecting signal of a load cell like a solenoid valve.

Therefore, the condensed water discharging apparatus according to the exemplary embodiment of the present invention can separate condensed water contained in recirculated hydrogen by using the drain tank installed in the hydrogen discharging line while securing a ground clearance of a sufficient height even when a fuel cell system is arranged on a bottom of a floor. In addition, only condensed water can be discharged by detecting hydrogen and condensed water by using the drain pump 13 having the load cell mounted therein.

As described above, according to the present invention, the condensed water discharging apparatus for a fuel cell system can prevent condensed water from being circulated together during hydrogen recirculation and prevent hydrogen from being discharged to the air by installing the drain tank for easily collecting condensed water mixed with hydrogen in the middle of the hydrogen discharging line and discharging a desired amount of condensed water at a desired time by using the drain pump, thereby improving the performance of the fuel cell system and system stability.

In addition, the condensed water discharging apparatus has a structure that the body is a cylinder form in which the longitudinal length is longer than the diameter and the inlet portion and the outlet portion are inclined at a predetermined angle with respect to the intermediate portion of hydrogen discharging line. Therefore, a sufficient ground clearance can be secured while separating condensed water from hydrogen by using gravity, and so it can be applied to a sedan type fuel cell system vehicle.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A condensed water discharging apparatus for a fuel cell system, comprises:
    a drain tank;
    a hydrogen discharging line including an inlet portion, an intermediate portion and an outlet portion wherein the inlet portion and the outlet portion are formed on both distal ends of the drain tank and the intermediate portion is formed between the input portion and the outlet portion of the hydrogen discharging line wherein the drain tank is configured to be around the intermediate portion;
    at least a drain hole installed along the intermediate portion of the hydrogen discharging line so that condensed water is separated from hydrogen flowing in through the intermediate portion by gravity and is drained downwardly through the drain hole to a bottom of the drain tank; and a drain pump connected to the drain tank to discharge the condensed water drained through the drain holes.

2. The condensed water discharging apparatus for a fuel cell system of claim 1, wherein the intermediate portion of the hydrogen discharging line is in fluid communication with the inlet portion and the outlet portion.

3. The condensed water discharging apparatus for a fuel cell system of claim 1, wherein the drain tank has a cylindrical form that the longitudinal length of the drain tank is longer than the diameter of the drain tank and is installed in a longitudinal direction along the hydrogen discharging line.

4. The condensed water discharging apparatus for a fuel cell system of claim 1, wherein the intermediate portion is configured to be disposed substantially horizontal and a proximate end of the intermediate portion and a proximate end of the inlet portion are lower than a distal end of the inlet portion so that the proximate end of the inlet portion is downwardly inclined with respect to the distal end of the inlet portion.

5. The condensed water discharging apparatus for a fuel cell system of claim 4, wherein a distal end of the intermediate portion and a proximate end of the outlet portion are lower than a distal end of the outlet portion so that the distal end of the outlet portion is upwardly inclined with respect to the longitudinal direction of the intermediate portion.

6. The condensed water discharging apparatus for a fuel cell system of claim 4, wherein the distal end of the inlet portion is downwardly inclined substantially at 20 degree with respect to the longitudinal direction of the intermediate portion.

7. The condensed water discharging apparatus for a fuel cell system of claim 5, wherein the distal end of the outlet portion is upwardly inclined substantially at 20 degree with respect to the longitudinal direction of the intermediate portion.

8. The condensed water discharging apparatus for a fuel cell system of claim 1, wherein the drain pump comprises a load cell mounted on an entrance thereof and detecting whether a fluid drained from the drain tank is hydrogen or condensate water, and the drain pump receives a detecting signal from the load cell and maintains a closed state if the fluid is regarded as hydrogen and is opened if the fluid is regarded as condensate water.

9. The condensed water discharging apparatus for a fuel cell system of claim 1, wherein the intermediate portion is formed in a tube in which the inlet portion and the outlet portion are integrally formed.

* * * * *

UNITED STATES PATENT AND TRADEMARK OFFICE
CERTIFICATE OF CORRECTION

| | | |
|---|---|---|
| PATENT NO. | : 7,727,315 B2 | Page 1 of 1 |
| APPLICATION NO. | : 11/949565 | |
| DATED | : June 1, 2010 | |
| INVENTOR(S) | : Youngjin Son et al. | |

It is certified that error appears in the above-identified patent and that said Letters Patent is hereby corrected as shown below:

ON THE TITLE PAGE, Item (54) and at Column 1, line 1, in the title,

Change "DISCHARGED" to -- DISCHARGING --.

Signed and Sealed this
First Day of February, 2011

David J. Kappos
*Director of the United States Patent and Trademark Office*